US011255390B2

(12) United States Patent
Fischer et al.

(10) Patent No.: US 11,255,390 B2
(45) Date of Patent: Feb. 22, 2022

(54) DISC BRAKE FOR A UTILITY VEHICLE

(71) Applicant: KNORR-BREMSE Systeme fuer Nutzfahrzeuge GmbH, Munich (DE)

(72) Inventors: Rudolf Fischer, Erding (DE); Martin Seidl, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 140 days.

(21) Appl. No.: 16/661,286

(22) Filed: Oct. 23, 2019

(65) Prior Publication Data

US 2020/0056668 A1    Feb. 20, 2020

Related U.S. Application Data

(63) Continuation of application No. PCT/EP2018/059315, filed on Apr. 11, 2018.

(30) Foreign Application Priority Data

Apr. 24, 2017 (DE) ..................... 10 2017 108 717.6

(51) Int. Cl.
| | |
|---|---|
| *F16D 55/2265* | (2006.01) |
| *F16D 55/227* | (2006.01) |
| *F16J 3/04* | (2006.01) |

(52) U.S. Cl.
CPC ..... *F16D 55/22655* (2013.01); *F16D 55/227* (2013.01); *F16J 3/042* (2013.01)

(58) Field of Classification Search
CPC ............. F16D 55/227; F16D 55/22655; F16D 2055/007; F16D 65/40; F16D 2055/0041;
(Continued)

(56) References Cited

U.S. PATENT DOCUMENTS 2,842,230 A * 7/1958 Macpherson ........ B60G 13/001
188/322.16
3,403,932 A * 10/1968 Kutcher .................. F16C 11/06
403/51
(Continued)

FOREIGN PATENT DOCUMENTS

| CN | 102869895 A | 1/2013 |
| CN | 104428554 A | 3/2015 |

(Continued)

OTHER PUBLICATIONS

English translation of WO 2014072301 A1 (Year: 2014).*

(Continued)

*Primary Examiner* — Robert A. Siconolfi
*Assistant Examiner* — Mahbubur Rashid
(74) *Attorney, Agent, or Firm* — Crowell & Moring LLP

(57) ABSTRACT

A brake caliper is fastened to a stationary brake carrier by two fastening elements such that the caliper can slide axially relative to the brake disc. The fastening elements each have a guide bar fixedly connected to the brake carrier, of which guide bars, one guide bar is guided as a fixed bearing and the other guide bar is guided in a plain bearing, which is designed as a floating bearing having a floating bearing axis. The floating bearing has a guide bush, which reaches around the guide bar and is retained in a caliper bore such that sliding is prevented. A first tubular, variable-length seal is arranged on the end region of the guide bar far from the brake disc, which seals the guide bar from the environment and is fastened on the guide bar and in the guide bush. The first tubular, variable-length seal is clamped on the guide bar by a cap pressed into the guide bar. The first tubular, variable-length seal has a ring section, which is inserted in a peripheral groove between a covering section, a collar, and a section of an outer surface. The ring section is retained by the section of the outer surface such that the ring section is (Continued)

secured in the radially inward direction with respect to the floating bearing axis. The ring section is retained by the covering section such that the ring section is secured in the radially outward direction with respect to the floating bearing axis.

14 Claims, 10 Drawing Sheets

(58) Field of Classification Search
CPC ............ F16D 55/2262; F16D 55/2265; F16D 55/228; F16D 65/0087; F16D 2069/0433; F16D 2065/1392; F16D 65/02
See application file for complete search history.

(56) References Cited

U.S. PATENT DOCUMENTS

| | | | | |
|---|---|---|---|---|
| 4,220,418 | A * | 9/1980 | Kondo | B62D 7/18 277/391 |
| 4,570,760 | A * | 2/1986 | Schmidt | F16D 55/22655 188/73.31 |
| 4,709,789 | A * | 12/1987 | Czich | F16D 55/22655 188/73.44 |
| 4,754,854 | A * | 7/1988 | Adachi | F16D 55/22655 137/154 |
| 4,768,626 | A | 9/1988 | Le Deit et al. | |
| 4,775,033 | A * | 10/1988 | Heibel | F16D 55/2262 188/73.43 |
| 4,977,987 | A * | 12/1990 | Schmidt | F16D 55/22655 188/264 G |
| 5,036,957 | A * | 8/1991 | Fouilleux | F16D 55/227 188/73.44 |
| 5,439,084 | A * | 8/1995 | Vila Boluda | F16B 33/002 188/73.44 |
| 5,927,446 | A * | 7/1999 | Evans | F16D 55/227 188/73.44 |
| 6,725,981 | B1 * | 4/2004 | Franz | F16D 55/22655 188/73.31 |
| 8,037,976 | B2 * | 10/2011 | Baumgartner | F16D 55/22655 188/73.31 |
| 2009/0000881 | A1 * | 1/2009 | Gasslbauer | F16D 55/22655 188/71.7 |
| 2009/0260928 | A1 | 10/2009 | Baumgartner et al. | |
| 2010/0044169 | A1 * | 2/2010 | Farooq | F16J 3/042 188/73.44 |
| 2013/0126280 | A1 * | 5/2013 | Gutelius | F16D 55/227 188/73.45 |
| 2013/0126284 | A1 | 5/2013 | Reiser | |
| 2015/0101893 | A1 | 4/2015 | Camilo-Martinez et al. | |
| 2016/0258499 | A1 | 9/2016 | Kloos | |
| 2017/0234378 | A1 * | 8/2017 | Fischer | F16D 55/227 188/73.45 |

FOREIGN PATENT DOCUMENTS

| | | | | |
|---|---|---|---|---|
| CN | 105937567 | A | 9/2016 | |
| DE | 3544362 | A1 * | 6/1987 | ....... F16D 55/22655 |
| DE | 196 36 940 | A1 | 3/1998 | |
| DE | 103 41 095 | A1 | 4/2005 | |
| DE | 10 2006 050 647 | A1 | 4/2008 | |
| DE | 196 36 942 | C5 | 7/2010 | |
| DE | 10 2012 021 690 | A1 | 5/2014 | |
| DE | 10 2015 114 438 | A1 | 3/2017 | |
| EP | 0 831 242 | B1 | 12/2001 | |
| EP | 2084422 | B1 * | 6/2014 | ........ F16D 55/22655 |
| EP | 2 917 603 | B1 | 1/2019 | |
| WO | WO 2007/023802 | A1 | 3/2007 | |
| WO | WO 2013/174964 | A1 | 11/2013 | |
| WO | WO-2014072301 | A * | 5/2014 | ....... F16D 55/22655 |

OTHER PUBLICATIONS

International Preliminary Report on Patentability (PCT/IB/326 & PCT/IB/373) issued in PCT Application No. PCT/EP2018/059315 dated Nov. 7, 2019, including English translation of document C2 (German-language Written Opinion (PCT/ISA/237 previously filed on Oct. 23, 2019)) (seven (7) pages).
International Search Report (PCT/ISA/210) issued in PCT Application No. PCT/EP2018/059315 dated Jul. 23, 2018 with English translation (six (6) pages).
German-language Written Opinion (PCT/ISA/237) issued in PCT Application No. PCT/EP2018/059315 dated Jul. 23, 2018 (five (5) pages).
German-language Office Action issued in counterpart German Application No. 10 2017 108 717.6 dated Nov. 9, 2017 (10 pages).
Chinese-language Office Action issued in Chinese Application No. 201880026993.6 dated May 9, 2020 with English translation (13 pages).

* cited by examiner

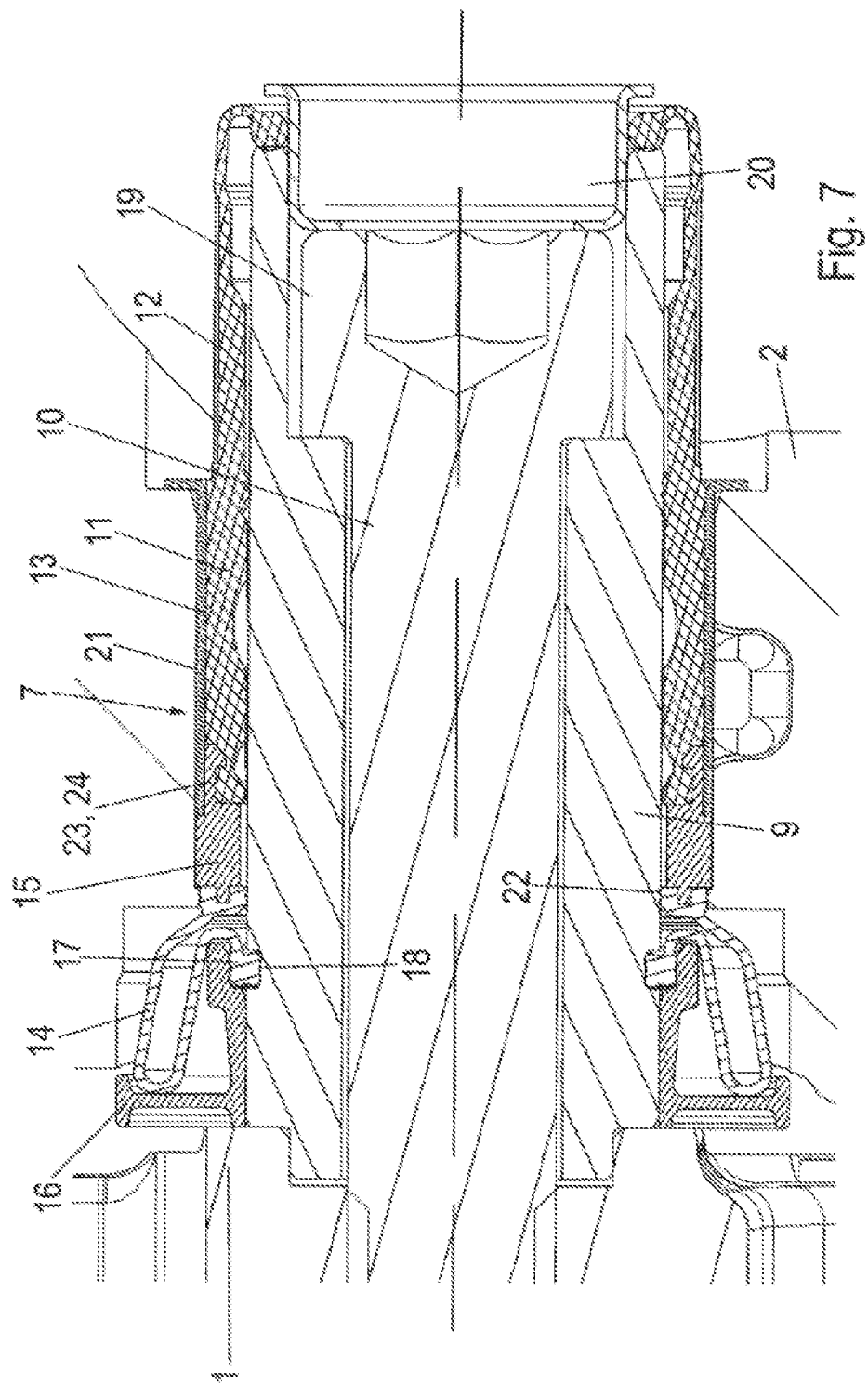

DISC BRAKE FOR A UTILITY VEHICLE

CROSS REFERENCE TO RELATED APPLICATIONS

This application is a continuation of PCT International Application No. PCT/EP2018/059315, filed Apr. 11, 2018, which claims priority under 35 U.S.C. § 119 from German Patent Application No. 10 2017 108 717.6, filed Apr. 24, 2017, the entire disclosures of which are herein expressly incorporated by reference.

BACKGROUND AND SUMMARY OF THE INVENTION

The invention relates to a disc brake for a utility vehicle having a brake caliper which encompasses a brake disc and which is fastened to a positionally fixed brake carrier by two fastening elements so as to be axially displaceable with respect to the brake disc, wherein the fastening elements each have a guide bar which is fixedly connected to the brake carrier, of which guide bars, for axial displaceability of the brake caliper, one is guided as a fixed bearing and the other is guided in a sliding bearing designed as a floating bearing which has a floating bearing axis. At least the floating bearing has a guide bush which engages around the guide bar and which is retained in a caliper bore of the brake caliper so as to be secured against displacement. A first tubular, length-variable seal which seals the guide bar with respect to the surroundings is arranged at least on the end region of the guide bar that faces away from the brake disc and is fastened on the one hand to the guide bar and on the other hand in the guide bush, wherein the first tubular, length-variable seal is clamped on the guide bar by a cap pressed into the guide bar.

Such disc brakes are used in particular in heavy commercial vehicles. Here, the brake caliper, which is also known by the designation sliding caliper, is connected by fastening elements to a vehicle-mounted brake carrier.

Guide bars of the fastening elements are connected to the brake carrier, customarily by bolting, with the guide bars being guided in sliding bearings of the brake caliper such that an axial displacement with respect to the brake disc in relation to the positionally fixed brake carrier is possible.

A sliding guide system for the sliding caliper consists of a main guide bearing and a so-called compensating bearing. The task of the sliding guide system is the retention of the brake caliper against external action of force, for example as a result of vibrational loading, an exact and as far as possible play-free positioning and the securement of a smooth displaceability during braking actuations and wear adjustments.

The securement of the displaceability is performed substantially by the main guide bearing, whereas the tasks of "retention" and "positioning" are met jointly by the main guide bearing and compensating bearing. Whereas the main guide bearing is equipped with narrow play, the compensating bearing must be provided, at least in the circumferential direction, with an increased play or with an elastic compensating possibility for compensating for spacing tolerances and for operationally induced changes in the bearing spacing.

For the intended function, the compensating bearing, which is referred to in the following as floating bearing, has a guide bush which engages around the guide bar and which is connected to the brake caliper so as to be secured against displacement, said guide bush having an elastic inner sleeve which consists of an elastomer. The elasticity of the inner sleeve prevents the occurrence of rattling noises as can occur due to tolerances in compensating bearings having a degree of play. Apart from low costs, a further advantage of the elastomer inner sleeve results from a high degree of robustness and a simple installation.

DE 10 2012 021 690 A1 describes a disc brake for a utility vehicle, having a brake caliper which encompasses a brake disc and which is fastened to a positionally fixed brake carrier by means of two fastening elements so as to be axially displaceable with respect to the brake disc. FIGS. 7 and 8 illustrate for this purpose in each case a floating bearing in a sectional view in different positions (FIG. 7 in the case of new brake pads and FIG. 8 in the case of worn brake pads). The fastening element of the floating bearing has a guide bar 9 which is fixedly connected to the brake carrier 1. The guide bar 9 is fastened by a head screw 10, which has a head 19, to the brake carrier 1, which is enclosed by a guide bush 7 with an elastic inner sleeve 11 in an outer sleeve 13 which is retained securely against displacement in a caliper bore 21 of the brake caliper 2. On the end region of the guide bar 9 that faces away from the brake disc there is arranged a first rolling bellows 12 which seals said guide bar with respect to the surroundings and which is fastened on the one hand to the guide bar 9 and on the other hand in the guide bush 7. The first rolling bellows 12 is additionally mounted clamped on the guide bar 9 by means of a cap 20 pressed into the guide bar 9.

The floating bearing furthermore comprises, toward the region of the guide bar 9 that faces the brake disc, a second rolling bellows 14, a stop ring 15 and a retaining ring with a bead 17 arranged in an annular groove 18 of the guide bar 9. The second rolling bellows 14 is connected to the inner sleeve 11 and the outer sleeve 13 via the stop ring 15, wherein the stop ring 15 is mounted on the inner sleeve 11 by means of a latching nose 23/latching recess 24. At the connection between the second rolling bellows 14 and the stop ring 15, a sealing lip 22 is integrally formed on the end of the second rolling bellows 14 and bears on the guide bar 9.

A comprehensive description can be found in DE 10 2012 021 690 A1.

These elastomer compensating bearings are used without fixed encapsulation, which is adequate for normal application. However, upon use in vehicles which are operated on unpaved or very dirty roads, and on construction sites and in off-road vehicles, stone impact and dirt loading can cause damage to the sealing and ingress of dirty water into the guide region of the bearing bush. The consequence of this can lead to very increased bearing wear and premature replacement of the bearing bush.

Further compensating bearings which have proved themselves are DU bearings with two-sided sealing. In both embodiments, the open ends have to be sealed with an additional component. This requires additional processing and mounting in the brake caliper and is thus cost-intensive. In addition, DU bearings tend to noise formation in terms of their play, which makes additional damping measures necessary.

In each case, the open ends, that is to say the end regions facing away from the brake disc, have to be sealed with an additional component, which, in a disc brake disclosed in DE 10 2006 050 647 A1, occurs by an attached cap which is connected to the brake caliper and which covers the end-side lateral surface region and the end face of the guide bar.

However, this requires additional processing of the brake caliper and mounting of the cap, which leads to corresponding additional costs.

DE 196 36 942 C5 describes a sliding caliper disc brake whose caliper is displaceably guided on a guide pin, wherein the guide pin extends through a through-opening in the caliper and projects by its free end out of the through-opening, and wherein a tubular, length-variable seal is provided which seals an annular space between the inner wall of the through-opening and the guide pin on one side and which is retained on the caliper on the one hand and on the free end of the guide pin on the other hand. The seal engages by an end portion behind the end face of the free end of the guide pin. A retaining device is provided which, together with the end face of the free end of the guide pin, forms a cross-sectionally U-shaped ring profile for retaining the end portion of the seal. The retaining device is configured in the form of a plug which is provided with a radial collar and which is held in an end-side recess of the guide pin, and the end portion of the seal bears against a lateral surface of the plug.

The object on which the invention is based is to further develop a disc brake of the type in question such that its service life is increased and its production costs are reduced using structurally simple means.

This object is achieved by a disc brake according to the invention.

There is thus achieved a pressure-tight encapsulation of the floating bearing of the disc brake with respect to the surroundings and thus with respect to driving-related influences without special processing of the brake caliper being required.

Especially when using the new disc brake in utility vehicles which are exposed to an increased risk of stone impact and dirt, the invention extends the service life of the disc brake to the degree influenced by the fastening elements.

A further advantage consists in the fact that the pressure-tight encapsulation makes it possible for the bearing arrangement to withstand the cleaning of the brake with a high-pressure cleaner.

The radial and axial installation space of the previous bearing and the functionality can be maintained.

According to the invention, there is provision that a double-sided rolling bellows is provided on the side facing the brake disc and the side facing away from the brake disc with a sealing element which is protected and pressed on the inside and outside. In addition, the central inner region of the bearing is provided with a sealing element which is protected and pressed on both sides.

The radial installation space in the interior of the HNBR elastomer sleeve is used unchanged by the outer rolling bellows, whereas the maintenance of the axial installation space in a position for new brake pads and for worn brake pads is maintained by the fact that the bearing is set deeper within the bore by the amount of the axially attached sealing ring portion (O-ring).

A disc brake according to the invention for a utility vehicle, having a brake caliper which encompasses a brake disc and which is fastened to a positionally fixed brake carrier by means of two fastening elements so as to be axially displaceable with respect to the brake disc, wherein the fastening elements each have a guide bar which is fixedly connected to the brake carrier, of which guide bars, for axial displaceability of the brake caliper, one is guided as a fixed bearing and the other is guided in a sliding bearing which is designed as a floating bearing which has a floating bearing axis, wherein at least the floating bearing has a guide bush which engages around the guide bar and which is retained in a caliper bore of the brake caliper so as to be secured against displacement, wherein a first tubular, length-variable seal which seals the guide bar with respect to the surroundings is arranged at least on the end region of the guide bar that faces away from the brake disc and is fastened on the one hand to the guide bar and on the other hand in the guide bush, wherein the first tubular, length-variable seal is clamped on the guide bar by means of a cap pressed into the guide bar, is designed in such a way that the first tubular, length-variable seal has a ring portion which is inserted in a peripheral groove between a covering portion, a collar and a portion of an outer surface, wherein the ring portion is retained by the portion of the outer surface so as to be radially inwardly secured with respect to the floating bearing axis, and wherein the ring portion is retained by the covering portion so as to be radially outwardly secured with respect to the floating bearing axis.

One embodiment provides that the collar is integrally formed on an end of the cap that faces away from the brake disc, and wherein the outer surface is a peripheral outer surface of a cylindrical body. This allows a compact design and a simple assembly.

In one embodiment, the ring portion in each case directly and/or indirectly contacts the outer surface and the covering portion. This makes possible in a simple manner not only a tight bearing of the ring portion but also a secure retention.

If the ring portion is secured and retained in a radially prestressed manner in the peripheral groove between the covering portion, the collar and the portion of the outer surface, there results the advantage of improved retention and sealing of the ring portion with respect to the cap.

In yet a further embodiment, the ring portion in the peripheral groove forms a pressure-tight seal with respect to the cap. This is particularly advantageous since a pressure-tight encapsulation with a high IP protection level is thus made possible, which prevents penetration of pressurized water, such as, for example, during high-pressure cleaning, and thus increases a service life of the floating bearing by reduced corrosion. At the same time, the guide bar can also be produced from a conventional steel material instead of a stainless steel material.

In one embodiment, the ring portion of the first tubular, length-variable seal has a circular cross section, since a simple production with a simple tool is thus possible, wherein a good sealing action, for example upon pressing, can be achieved.

One embodiment provides that the peripheral groove is formed into an end face of the end region of the guide bar that faces away from the brake disc and is radially outwardly delimited with respect to the floating bearing axis by the covering portion as a portion of an end portion of the guide bar, and wherein the covering portion extends axially parallel to the floating bearing axis. This is a compact and simple design.

It is advantageous here that the ring portion in the peripheral groove is prestressed axially directly or indirectly with respect to the guide bar, since a secure retention is thus achieved.

In an alternative embodiment, the peripheral groove is formed as an annular groove between a lower side of the covering portion, an inner side of the collar and the outer surface, wherein the covering portion is mounted on the outer radial end of the collar of the cap and extends axially parallel to the floating bearing axis in the direction of the brake disc. This is advantageous for a compact design.

In a further embodiment, there is provision that the ring portion is prestressed in the peripheral annular groove between the covering portion, the collar and the portion of the outer surface of the cap by a peripheral pressing. This can be realized in a simple and cost-effective manner.

Here, in yet a further embodiment, the ring portion is enveloped in the annular groove of the cap by its collar and the covering portion in an angular range of 160 to 190°, wherein the outer surface of the ring portion is in direct or indirect contact at least with the outer surface of the cap and with the inner side of the covering portion of the cap. An additional mechanical protection can advantageously be formed in this way.

In another embodiment, the ring portion in the peripheral groove is prestressed axially directly or indirectly with respect to the guide bar. This results in an advantageously simple and effective fixing and sealing.

Another embodiment provides that the ring portion is connected axially to a peripheral web which is in contact with a peripheral end surface of the guide bar. The web provides a support on the guide bar and thus facilitates mounting of the cap.

If a connection between the web and the ring portion is provided with a waisting, there results the advantage of a targeted control of a rolling movement of the first rolling bellows.

Yet another embodiment provides that the first tubular, length-variable seal is mounted on the ring portion and on the web via a connecting portion, wherein the connecting portion forms a joint function between the tubular, length-variable seal and the ring portion and the web. This results in an advantageously simple and compact design.

In one embodiment, the guide bush has an elastic inner sleeve.

Tolerance differences can thus be compensated in a simple manner.

For a compact design and a simplified mounting, in one embodiment the first tubular, length-variable seal can be connected to the inner sleeve, and, in an alternative embodiment, the first tubular, length-variable seal can be formed in one piece with the inner sleeve.

Yet a further embodiment provides that the first tubular, length-variable seal is designed as a rolling bellows, which results in an advantageously compact design.

An advantageous further seal is made possible by virtue of the fact that a second tubular, length-variable seal is connected to the side of the guide bush that is opposite to the first tubular, length-variable seal, and is connected on the other side to the guide bar. A pressure-tight encapsulation of the bearing can thus be achieved in a simple manner.

In one embodiment, the second tubular, length-variable seal is fastened to a stop ring which is connected to, preferably latched with, the guide bush. This is advantageous for a compact design and a simple assembly.

For an advantageous seal, there is provision that the second tubular, length-variable seal has a bead at its edge facing away from the stop ring, which bead is situated in an annular groove of the guide bar and is retained by a retaining ring, which is fastened in the brake caliper, in the annular groove.

In a further embodiment, the stop ring has at its outer surface a peripheral groove with a seal. This is advantageous since the stop ring can thus have a plurality of functions, i.e. connecting or sealing in a component.

If the seal has at least one double sealing lip, an advantageous sealing action can be produced in the associated bore.

Alternatively, the seal can be integrally formed as at least one double sealing lip on the stop ring in the groove, resulting in a particularly compact design.

A further embodiment provides that the second tubular, length-variable seal is designed as a second rolling bellows. This results in a compact and simple design.

The following advantages result:
1. A pressure-tight encapsulation of the outer (first) rolling bellows by a ring portion, which is integrally formed as an O-ring, in an annular groove of cap and sealing by two-sided pressing with an additional shielding action by the cap and a control of the rolling movement.
2. A pressure-tight encapsulation of the inner (second) rolling bellows by an integrally formed/molded-on double sealing lip in an annular groove of the molded-on stop ring and sealing by pressing in bore in the protected position.
3. A pressure-tight encapsulation of the inner (second) rolling bellows by a molded-on bead or Quad ring and sealing by pressing in the annular groove of the guide bar and retaining ring or supporting ring in the protected position.
4. A facilitation of the mounting by supporting by a molded-on web on the ring portion (O-ring).
5. Automatic mounting is thus also made possible.
6. Retrofitting is possible.
7. An impact protection is present by the exposed cap in the new state.
8. Installation space requirements on the part of the customer are met in the new state by the outer edge of the cap, and in the worn state by the outer edge of the first rolling bellows.
9. The additional sealing elements/sealing structures furthermore allow a so-called modular design with all the advantages thereof.
10. Since the guide bar is encapsulated in a pressure-tight manner, a guide bar consisting of conventional steel can be used instead of a stainless steel version, resulting in cost advantages in material and processing.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 7 and 8 show schematic sectional views of a floating bearing in different positions according to the prior art.

DETAILED DESCRIPTION OF THE DRAWINGS

Figure 1:
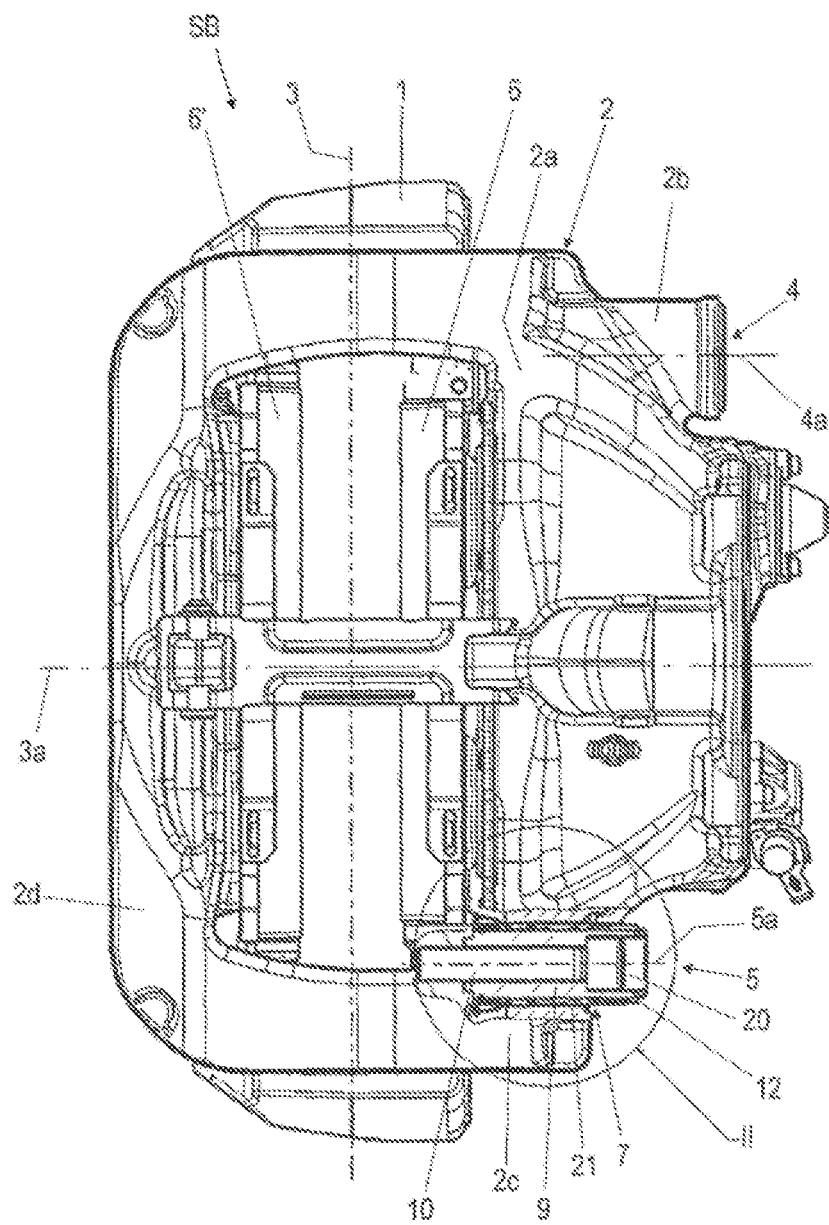
FIG. 1 shows a disc brake according to an embodiment of the invention in a schematic plan view in an unworn state with a floating bearing in a partial sectional view.
Figure 2:
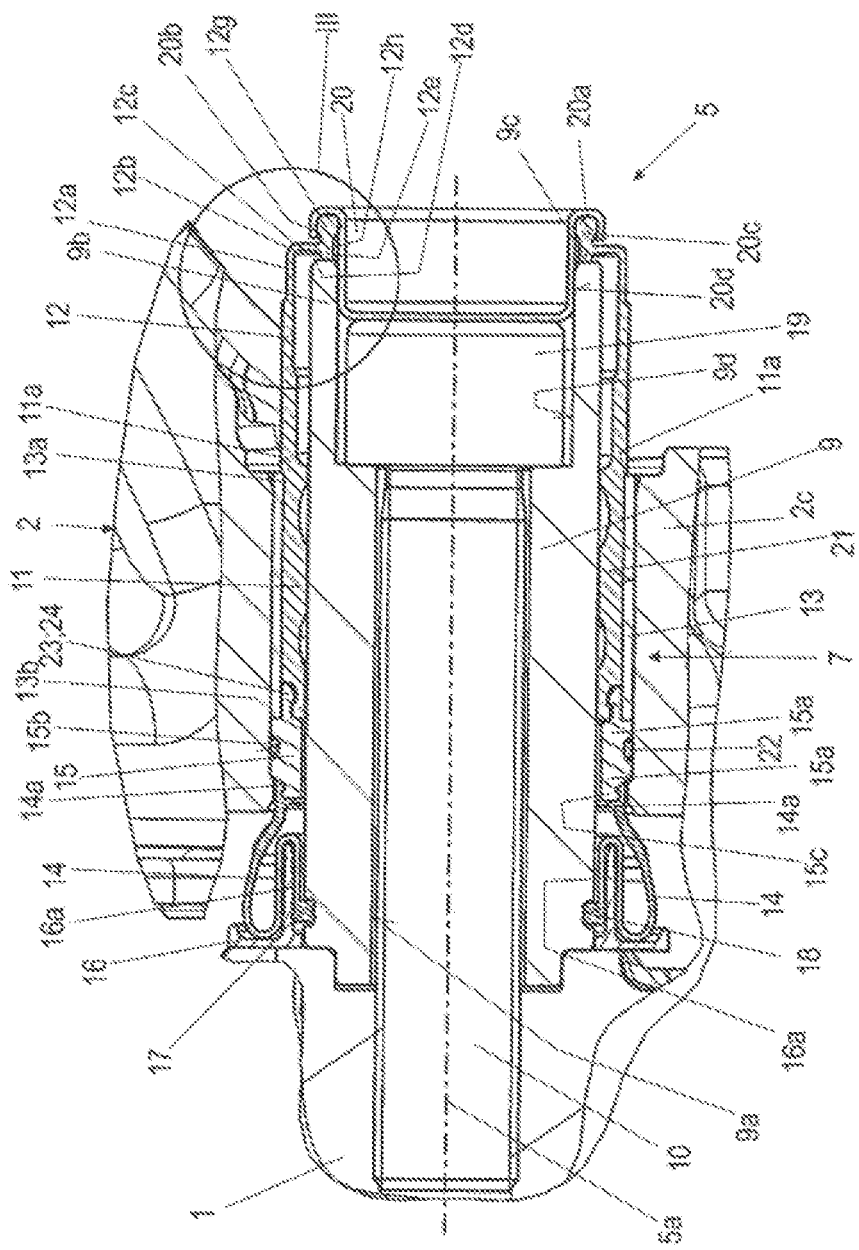
FIG. 2 shows an enlarged, schematic sectional view of the floating bearing of the marking II according to FIG. 1 in a first position.
Figure 3:
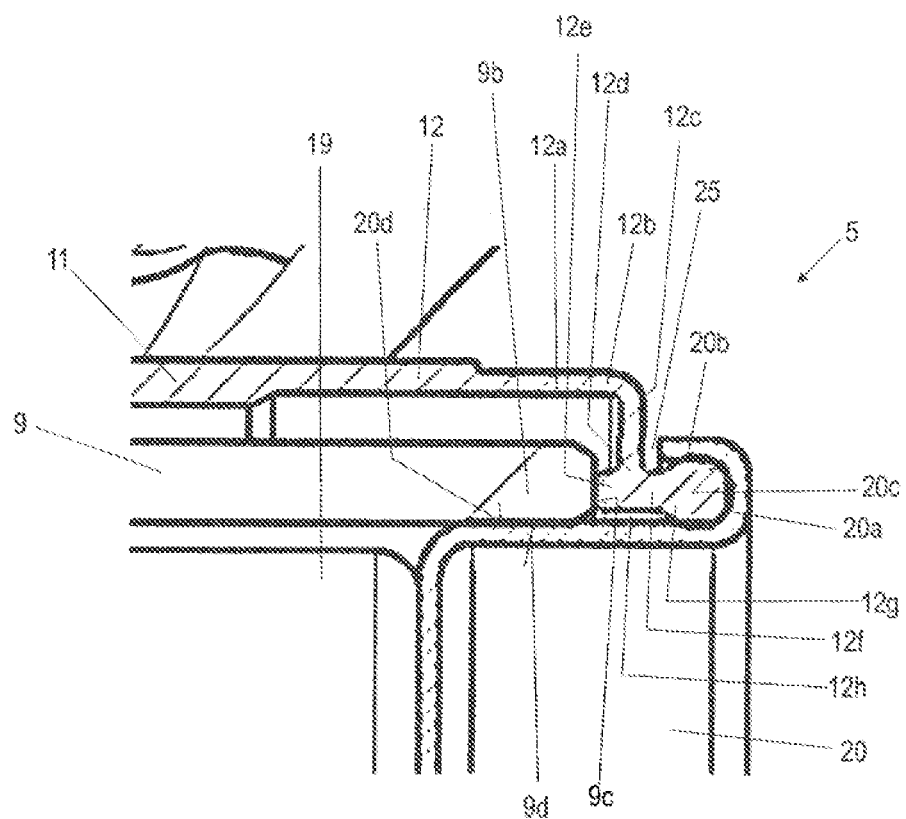
FIGS. 3-3A show enlarged, schematic sectional views of the marking III according to FIG. 2.

FIG. 1 shows a disc brake SB in a schematic plan view in an unworn state with a floating bearing 5 in a partial sectional view. FIG. 2 shows an enlarged, schematic sectional view of the floating bearing 5 of the marking II according to FIG. 1 in a first position. FIG. 3 illustrates an enlarged, schematic sectional view of the marking III according to FIG. 2.

The disc brake SB is provided in this example for a commercial vehicle and comprises a brake carrier 1, a brake caliper 2, a brake disc 3 with a brake disc axis of rotation 3*a*, and brake pads 6, 6'.

Here, the brake disc 3 is indicated only symbolically by a center line which extends in a center plane of the brake disc 3.

The brake carrier 1 is mounted in a positionally fixed manner on a vehicle to which the disc brake SB is assigned. The brake caliper 2 has an application portion 2*a* with two bearing portions 2*b*, 2*c* and a caliper rear 2*d* which is connected to the application portion 2*a*. The brake caliper 2 engages over the brake disc 3 in such a way that the latter is arranged between the application portion 2*a* and the caliper rear 2*d*.

On both sides of the brake disc 3, a respective brake pad 6, 6' is arranged in the brake carrier 1. The brake pad 6 which is arranged on the side of the brake disc 3 that faces the application portion 2*a* of the brake caliper 2 is called the application-side brake pad 6. The other brake pad 6' is referred, with respect to the caliper rear 2*d* of the brake caliper 2, as rear-side brake pad 6'.

The brake caliper 2 is mounted on the brake carrier 1 so as to be axially displaceable with respect to the brake disc 3 in the direction of the brake disc axis of rotation 3*a*. For this purpose, two fastening elements are provided, one of which forms a fixed bearing 4 with a fixed bearing axis 4*a* and the other forms the floating bearing 5 with a floating bearing axis 5*a*. The fixed bearing axis 4*a* and the floating bearing axis 5*a* extend parallel to one another and to the brake disc axis of rotation 3*a*.

The floating bearing 5 comprises a guide bush 7, a guide bar 9, a head screw 10 with a head 19, an inner sleeve 11, a first tubular, length-variable seal, which is here designed as a first rolling bellows 12 (outer rolling bellows 12), an outer sleeve 13, a second tubular, length-variable seal, which is designed here as a second rolling bellows 14 (inner rolling bellows 14), a stop ring 15 and a retaining ring 16.

The floating bearing 5 is here referred to as a so-called double rolling bellows bearing.

The guide bar 9 is fixedly connected to the brake carrier 1 by means of a head screw 10 which is guided through a central bore 9*a* in the guide bar 9.

The brake caliper 2 has a respective bearing portion 2*b*, 2*c* on both sides of the application portion 2*a*. The one bearing portion 2*b* receives the fixed bearing 4, and the other bearing portion 2*c* is provided with the floating bearing 5. In the other bearing portion 2*c*, the guide bush 7 of the floating bearing 5 is retained securely against displacement, wherein the brake caliper 2 is displaceably mounted above on the guide bar 9.

In the exemplary embodiment shown, the guide bush 7 has the elastic inner sleeve 11 and the metal outer sleeve 13 which encloses the latter and which is pressed into a caliper bore 21 of the other bearing portion 2*c* of the brake caliper 2. In another embodiment (not shown), the guide bush 7 has only the outer sleeve 11 without the elastic inner sleeve 11, wherein the outer sleeve 13 is then pushed directly onto the guide bar 9 by its inner bore and can have a correspondingly thicker wall thickness.

The inner sleeve 11 consists of a plastic, preferably an elastomer, for example HNBR, and is molded onto the inner wall of the outer sleeve 13. On the inner side, the inner sleeve 11 is supported on the guide bar 9.

The first rolling bellows 12 is provided on an end portion 9*b* of the guide bar 9 that faces away from the brake disc 3 and seals the guide bar 9 with respect to the surroundings. The first rolling bellows 12 is fastened on the one hand to the guide bar 9 and on the other hand to the guide bush 7.

The fastening of the first rolling bellows 12 to the guide bush 7 can occur directly on the guide bush 7 and/or on the inner sleeve 11 (if this is present). The first rolling bellows 12 can also, as realized in the exemplary embodiment shown here, be formed in one piece with the inner sleeve 11, that is to say it consists of the same material and forms as it were an extension of the inner sleeve, wherein it extends over the end portion 9*b* of the guide bar 9. In order to fix the first rolling bellows 12 to the guide bar 9, the first rolling bellows 12 is clamped by its free end by means of a cap 20 which covers a head 19 of the head screw 10 and which is pressed at the end side into a head bore 9*d* of the guide bar 9. This will now be described in detail.

Figure 8:
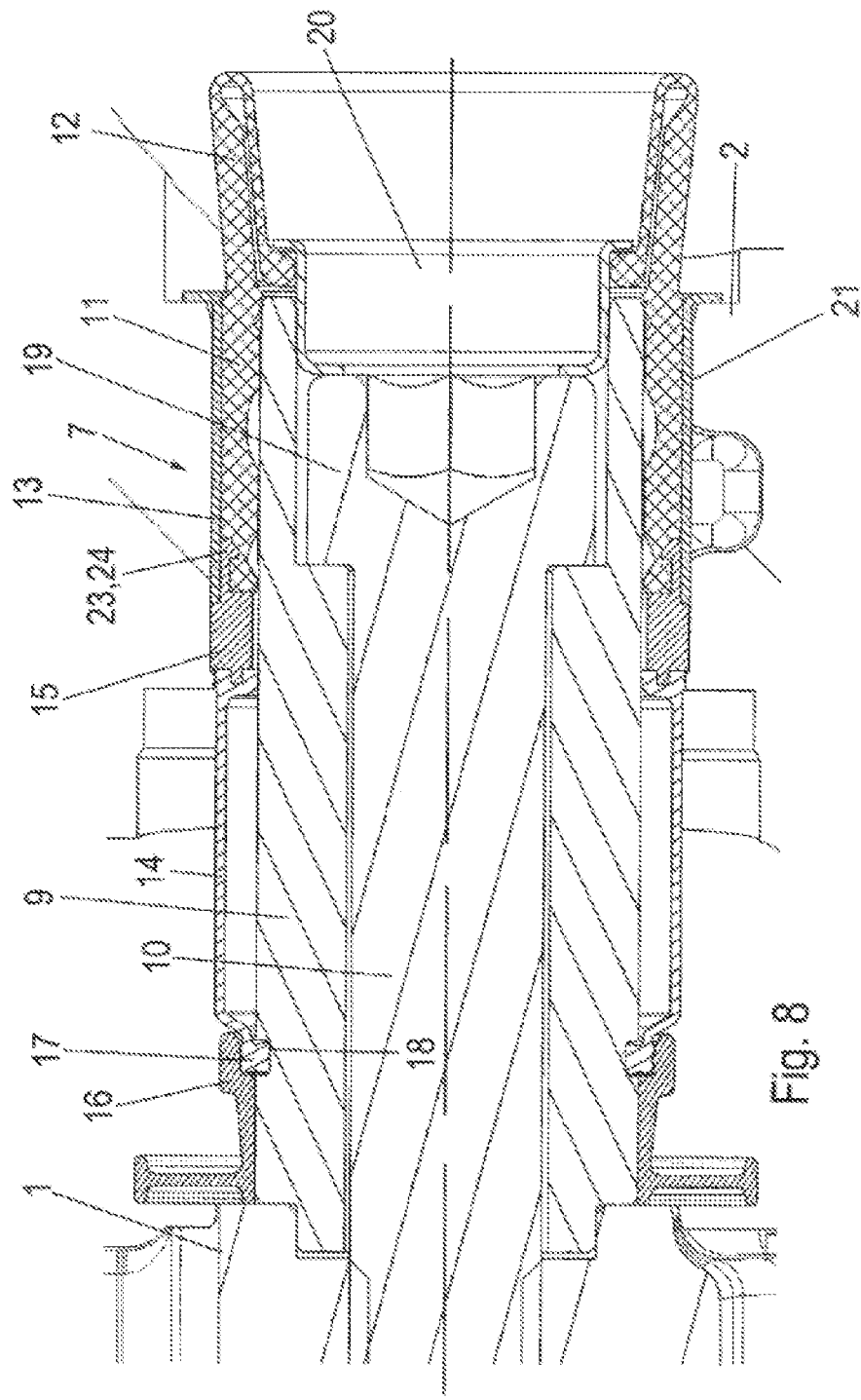

By contrast with the prior art according to FIGS. 7 and 8 which is comprehensively described in DE 10 2012 021 690 A1, the first rolling bellows 12 here comprises bellows portions 12*a*, 12*b* and 12*c*, a connecting portion 12*d*, a web 12*e* and a ring portion 12*g*.

An end 13*a* of the outer sleeve 13 that faces away from the brake disc 3 bears axially against a shoulder 11*a* of the inner sleeve 11. An end 13*b* of the outer sleeve 13 that faces the brake disc 3 is in contact with the stop ring 15.

In a further difference over the aforementioned prior art, the cap 20 has not only a collar 20*a*, which is integrally formed on the end of a cylindrical body of the cap 20 that faces away from the brake disc 3, but additionally a peripheral covering portion 20*b* which is mounted on the outer radial end of the collar 20*a* and extends axially substantially parallel to the floating bearing axis 5*a* in the direction of the brake disc 3. A groove 20*c* is formed in between a lower side of the covering portion 20*b*, an inner side of the collar 20*a* and a peripheral outer surface 20*d* of the cylindrical body of the cap 20.

FIGS. 2 and 3 show a position of the floating bearing 5 in which the brake pads 6, 6' of the disc brake SB are new and not yet worn. Here, the first bellows portion 12*a* of the first rolling bellows 12 is arranged above the end portion 9*b* of the guide bar 9. The first bellows portion 12*a* is connected, via the second bellows portion 12*b*, which is bent over in this position by about 90° toward the floating bearing axis 5*a*, to the third bellows portion 12*c*, which extends radially toward the floating bearing axis 5*a* and merges into an outer radial end of the connecting portion 12*d*.

The connecting portion 12*d* for its part is connected by its inner radial end to the peripheral web 12*e*, wherein the connecting portion 12*d* forms a joint function between the tubular, length-variable seal, that is to say first rolling bellows 12, and the ring portion 12*g* and the web 12*e*. This is clearly shown in FIGS. 5 and 6.

The web 12*e* extends in the axial direction substantially parallel to the floating bearing axis 5*a* in a portion pointing toward the brake disc 3 and in the axial opposite direction thereto. The portion of the web 12e that points toward the brake disc 3 is in contact with a peripheral end surface 9c of the guide bar 9.

The other portion of the web 12e, which points away from the brake disc 3, is connected to the ring portion 12g. This connection between the web 12e and the ring portion 12g is provided with a waisting 12f. In this way, the ring portion 12g is attached axially to the web 12e.

Figure 3A:
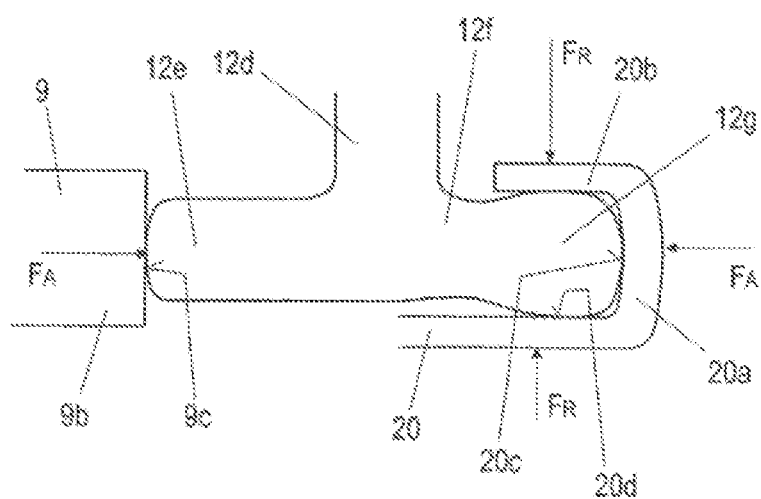

FIG. 3A shows a further schematic sectional view of the ring portion 12g in interaction with the cap 20 and of the web 12e in interaction with the cap 20 and the guide bar 9.

The ring portion 12g is inserted in the peripheral groove 20c between covering portion 20b, collar 20a and outer surface 20d of the cap 20. Here, the ring portion 12g is securely retained radially inwardly with respect to the floating bearing axis 5a (see FIG. 2) by an outer surface 20d of the cap 20. Here, the ring portion 12g is directly or else indirectly in contact with the outer surface 20d, for example via an insert part and/or adhesive. The term "radially inwardly" means a direction with respect to the floating bearing axis 5a (see FIG. 2).

The ring portion 12g is retained securely by the covering portion 20b of the cap 20 radially outwardly, that is to say extending in a direction with respect to the floating bearing axis 5a radially outwardly therefrom. Here, the ring portion 12g is directly or else indirectly in contact with a lower side of the covering portion 20b, for example via an insert part and/or adhesive.

The insert part can, for example, be a half-open insert sleeve which completely or else only partially lines the groove 20c. What is concerned here can also be a coating of the groove 20c, for example a liquid seal or a sealing adhesive.

The ring portion 12g is securely retained in a radially prestressed manner in the peripheral groove 20c between the covering portion 20b, the collar 20a and the portion of the outer surface 20d of the cap 20. Here, in each case a radial prestressing force $F_R$ acts radially inwardly (upper arrow) and radially outwardly (lower arrow) on the ring portion 12g.

The radial prestressing forces $F_R$ can be generated, for example by virtue of the fact that the ring portion 12g is prestressed in the peripheral groove 20c between the covering portion 20b, the collar 20a and the portion of the outer surface 20d of the cap 20 by a peripheral pressing of the covering portion 20b.

The respective radial prestressing force $F_R$ has the effect that the ring portion 12g of the first rolling bellows 12 in the peripheral groove 20c forms a pressure-tight seal, which is also referred to as a pressure-tight encapsulation, with respect to the cap 20. This pressure-tight encapsulation forms a so-called IP protection level against penetration of pressurized liquid, for example during cleaning with high-pressure cleaners. It is thus possible to achieve the protection level IP 69 in accordance with DIN EN 60529 or IP6K9K in accordance with ISO 20653 (6: dust-tight; 9: protection against water under high-pressure/steam jet cleaning).

Such sealing can also be realized by a sealing adhesive or a sealing insert part, as mentioned above.

Here, the ring portion 12g is enveloped at an angle in the groove 20c of the cap 20 by a portion of the outer surface 20d of the cap 20, by the collar 20a of the cap 20 and by the covering portion 20b of the cap 20, wherein the angle has a value in the range from 160° to 190°, preferably 180°. The term "enveloped" is to be understood as meaning that the outer surface of the ring portion 12g is directly or indirectly in contact at least with the outer surface 20d of the cap 20 and with the inner side of the covering portion 20b of the cap 20, as is described above.

If the radial prestressing force $F_R$ is applied to the ring portion 12g, an axial prestressing of the ring portion 12g together with the web 12e mounted thereon is also generated by axial prestressing forces $F_A$. Here, the ring portion 12g in the groove 20c is supported on the inner side of the collar 20a of the cap 20, with the web 12e being supported on the end surface 9c of the guide bar 9.

The ring portion 12g here has a circular-ring-shaped cross section and can also be referred to as an O-ring portion. It is of course also possible that other cross-sectional shapes, for example a Quad ring, can be used.

This groove 20c between covering portion 20b, collar 20a and outer surface 20d of the cap 20 serves as a housing for the axially molded-on ring portion 12g of the outer first rolling bellows 12 and simultaneously controls a rolling movement which results by virtue of wear of the brake pads 6, 6' (and also of the brake disc 3). In this way, the ring portion 12g is pressed on both sides between covering portion 20b and outer surface 20d of the cap 20, wherein the exposed position of the ring portion 12g is simultaneously protected from damage.

The web 12e, which is integrally formed on the side of the ring portion 12g that points toward the brake disc 3, forms a play-free support on the guide bar 9 through its contact with the planar end surface 9c of the guide bar 9. It is thereby additionally possible that the cap 20 can be securely mounted by way of the groove 20c.

The attachment, provided with the waisting 12f, between the ring portion 12g and the web 12e serves, in addition to a structurally provided play 25 (between covering portion 20b and the third bellows portion 12c, for tolerance compensation between the components.

The play 25 is provided as a structural clearance for tolerance compensation between cap 20 with groove 20c, guide bar 9 consisting of conventional steel and first rolling bellows 12 with protection from damage.

Additionally provided is a peripheral interspace 12h between the radial inner surface of the web 12e and the outer surface 20d of the cap 20.

Figure 4:
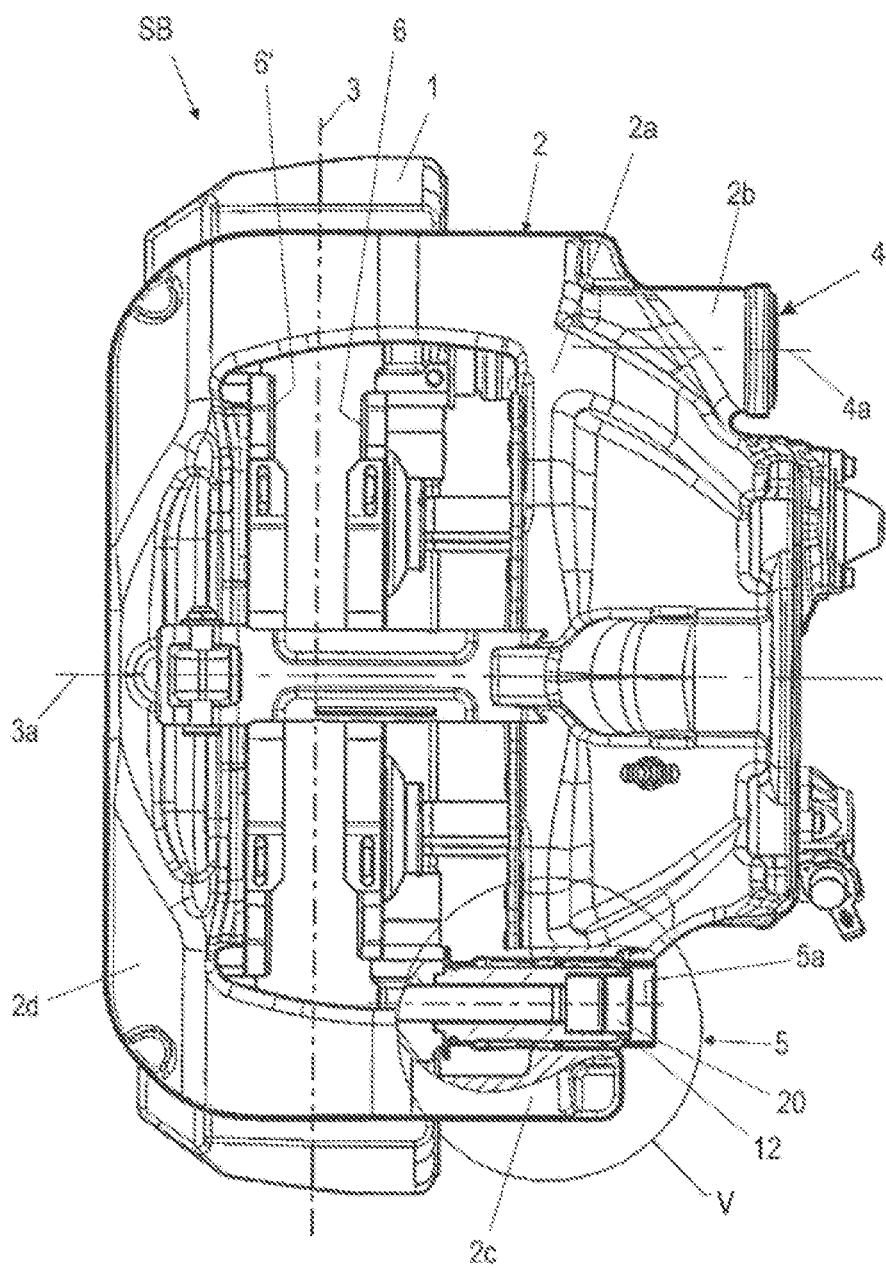
FIG. 4 shows a schematic plan view of the disc brake according to FIG. 1 in a worn state.
Figure 5:
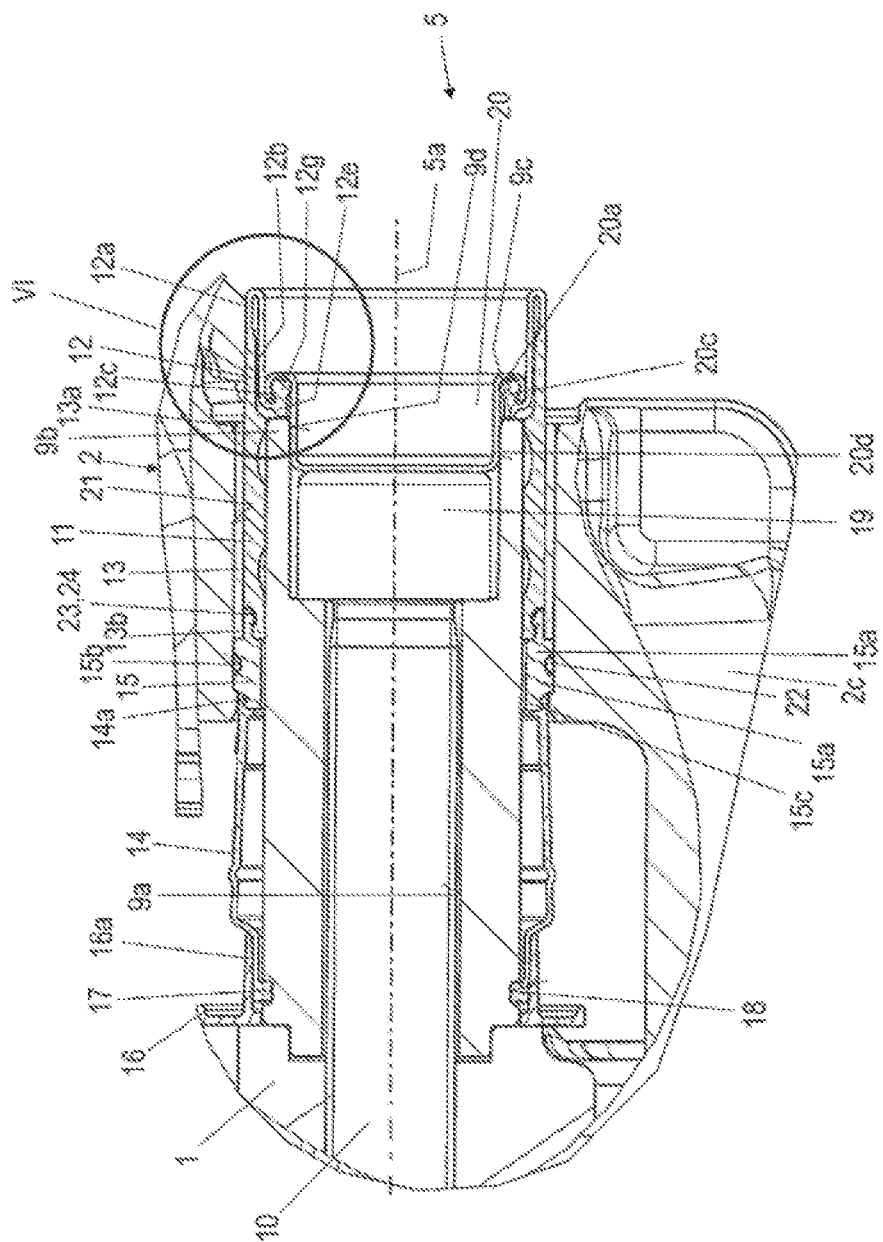
FIG. 5 shows an enlarged, schematic sectional view of the floating bearing of the marking V according to FIG. 4 in a second position.
Figure 6:
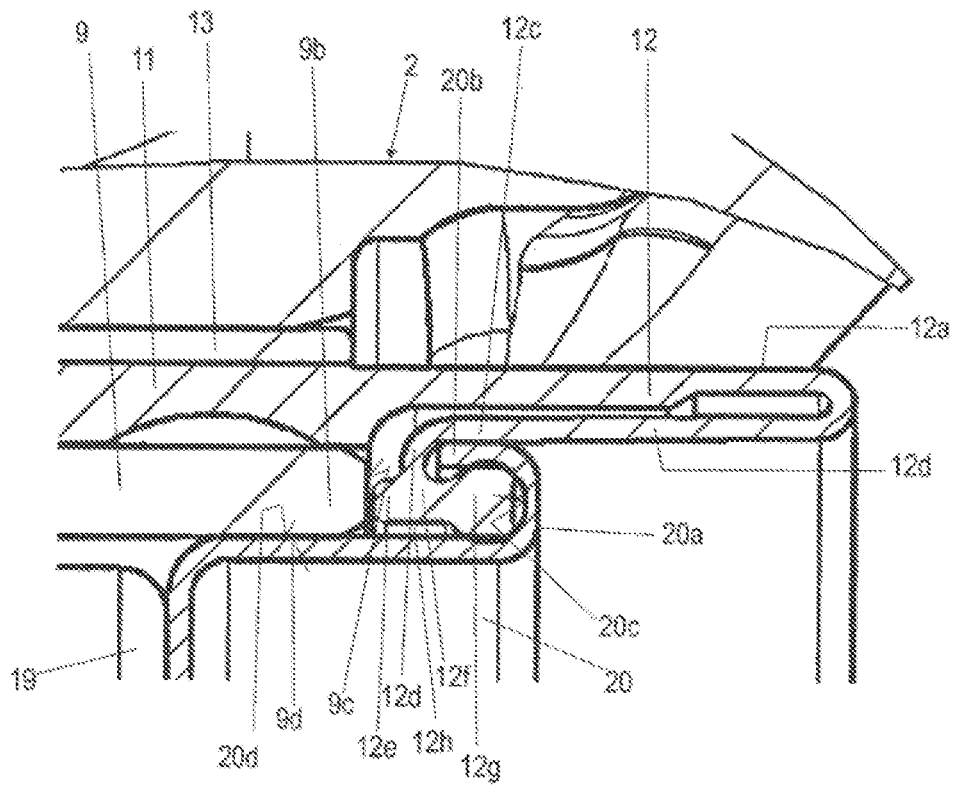
FIG. 6 shows an enlarged, schematic sectional view of the marking VI according to FIG. 5.

FIG. 4 shows a disc brake SB according to the invention in a schematic plan view in a worn state of the brake pads 6, 6' in a partial sectional view. FIG. 5 illustrates an enlarged, schematic sectional view of the floating bearing 5 of the marking V according to FIG. 4 in a second position. FIG. 6 shows an enlarged, schematic sectional view of the marking VI according to FIG. 5.

FIGS. 5 and 6 show a second position of the floating bearing 5 in which the brake pads 6, 6' (and also the brake disc 3) of the disc brake SB are worn.

In the second position, that is to say in the case of worn brake pads 6, 6', the first bellows portion 12a is turned partially and the second bellows portion 12b and the third bellows portion 12c of the first rolling bellows 12 are turned by 180° below the outwardly projecting part of the rolling bellows 12. The connecting portion 12d is bent outwardly, that is to say pointing away from the brake disc 3, over the covering portion 20b of the cap 20.

The ring portion 12g is furthermore arranged in a pressure-tight position in the groove 20c of the cap 20.

A central inner region at the connection point of the inner sleeve 11 to the second rolling bellows 14, which is also referred to as an inner rolling bellows 14, has the stop ring 15 with the clip connection. Here, the second rolling bellows 14 is connected on the one hand to the guide bush 7 and on the other hand to the guide bar 9, wherein, for connection to the guide bush 7, the stop ring 15 is provided which engages with a peripheral latching nose 23 as a type of barb in a peripheral latching recess 24 of the inner sleeve 11 in a form-fitting manner, whereas the second rolling bellows 14 is molded on the stop ring 15 at the other edge region. In this way, the two components are connected to one another in a form-fitting manner.

The second rolling bellows 14 covers the free lateral surface region of the guide bar 9.

The stop ring 15 has on its outer surface a peripheral groove 15b between two peripheral projections 15a. A seal 22 with an independent double sealing lip is arranged in this groove 15b in the protected position. This seal 22 can also be molded on. A pressure-tight encapsulation is thus achieved at this point. The double sealing lip of the seal 22 interacts with the inner wall of the caliper bore 21 which is a bore, configured as a fit, for the inner sleeve 11, for example HNBR elastomer, injection-molded into the sheet metal lateral surface of the outer sleeve 13, and is sealed in this manner.

The task of this "radial seal 22 by means of molded-on sealing lip in the caliper bore 21" is comprehensively described in DE 10 2012 021 690 A1. However, this is contrasted by the groove 15b in the stop ring 15 with the independently molded-on seal 22 with double sealing lip.

The point facing the brake disc 3 and thus under higher temperature loading is, for example, a sealing element in the form of a silicone rolling bellows as second rolling bellows 14 which is molded on the already described stop ring 15. The other end of the inner second rolling bellows 14 (silicone rolling bellows) seals radially in an annular groove 18 in the guide bar 9 as a bead 17 and is pressed on both sides by means of the retaining ring 16 and secured in a form-fitting manner. For this purpose, the retaining ring 16 has a peripheral ring portion 16a which extends axially away from the brake disc 3. The second rolling bellows 14 is turned around this ring portion 16a.

The retaining ring 16 in turn fulfils the function of shielding the silicone rolling bellows as second rolling bellows 14 against temperature and mechanical damage and of ensuring the sealing function of the bead 17, for example Quad ring, of the molded-on second rolling bellows 14 in the annular groove 18.

The retaining ring 16 ensures reliable sealing of the bead 17 (Quad ring) with respect to the annular groove 18 in the guide bar 9 in that, by virtue of its shaping, it secures the bead 17 (Quad ring) in the annular groove 18 under slight pressing force even during the rolling movement.

The retaining ring 16 is configured in its shape in such a way that it limits the travel of the second rolling bellows 14 on the side of the brake carrier 1 and thus produces a safety distance from the side facing the brake disc 3. As a result, the second rolling bellows 14 carries out a directed, deflected rolling movement and is not fully exposed to the temperature-endangered region. The task of the "radial seal 17 in an annular groove 18 of the guide bar 9 with two-sided pressing by the retaining ring 16" can be found in DE 10 2012 021 690 A1.

In this way, the guide bar 9 is sealed by the first rolling bellows 12 including the inner sleeve 11 and the second rolling bellows 14 and can be produced from conventional steel material instead of stainless steel.

Figure 6A:
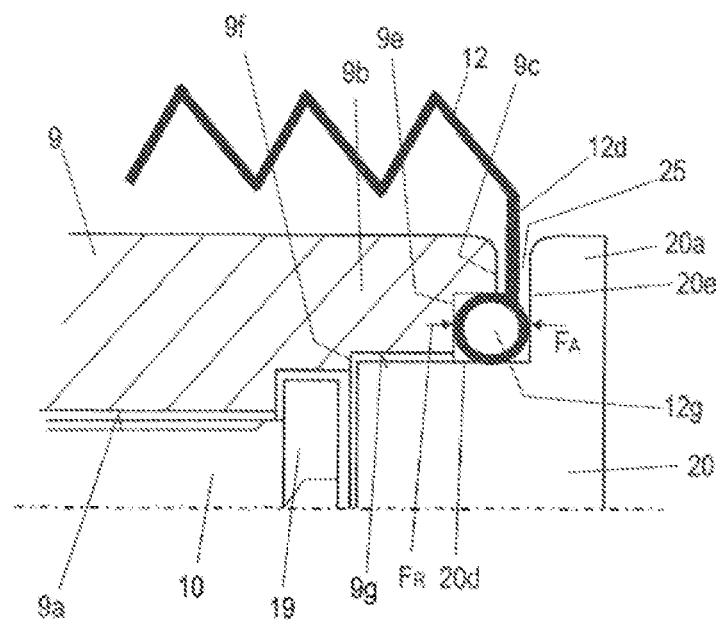
FIG. 6A shows an enlarged, schematic sectional view of a further exemplary embodiment in an unworn state.

FIG. 6A illustrates an enlarged, schematic sectional view of a further exemplary embodiment of the floating bearing 5 in an unworn state.

Here, by contrast to the first exemplary embodiment, the ring portion 12g of the first rolling bellows 12 is arranged in a groove 9e of the end portion 9b of the guide bar 9. The groove 9e is formed into the end surface 9c of the end portion 9. A peripheral covering portion 9h is formed here which is arranged on the radial outer side of the groove 9e in the end portion 9b of the guide bar 9. The covering portion 9h extends axially parallel to the floating bearing axis 5a.

The cap 20 has the collar 20a without covering portion 20b and is not supported on the head 19 of the head screw 10 but on a shoulder 9f of a stepped bore 9g coaxial to the bore 9a.

The ring portion 12g is inserted in the groove 9e in such a way that it is directly or indirectly in contact with its end wall, an inner side of the covering portion 9h, a portion of the outer surface 20d of the cap 20 and a bearing surface 20e of the collar 20a of the cap 20.

Pressing the cap 20 with its outer surface 20d into the stepped bore 9g of the end portion 9b of the guide bar 9 causes the ring portion 12g of the first rolling bellows 12 to be pressed axially against the end wall of the groove 9e and to be prestressed, wherein axial prestressing forces $F_A$ act. This simultaneously also generates a radial prestressing in the ring portion 12g, which is radially supported against the lower side of the end portion 9h and the outer surface 20d of the cap 20.

The above-described play 25 is provided between the bearing surface 20e of the collar 20a of the cap 20 and the end surface 9c of the end portion 9b of the guide bar 9.

A material of the cap 20 can be a metal, a combination of a suitable plastic and metal or of a suitable plastic.

The invention is not limited to the exemplary embodiments described but can be modified within the scope of the claims.

It is thus conceivable, for example, that instead of the sealing function between the ring portion 12g of the first rolling bellows 12 and the cap 20, a sealing function is transferred to the cap 20. In this case, the outer surface 20d of the cap 20 can be sealed in the associated bore 9a of the guide bar 9 with respect to the guide bar 9 by means of a suitable sealing arrangement. This can be made possible, for example, by sealing lips integrally formed on the outer surface 20d of the cap 20. The cap 20 can have reinforcements by means of suitable insert parts in its body. This is not shown, but easily conceivable. In addition, an opening can be provided in the bottom of the cap 20 to mount the head screw 10.

LIST OF REFERENCE SIGNS

1 Brake carrier
2 Brake caliper
2a Application portion
2b, 2c Bearing portion
3 Brake disc
3a Brake disc axis of rotation
4 Fixed bearing
4a Fixed bearing axis
5 Floating bearing
5a Floating bearing axis
6, 6' Brake pad
7 Guide bush
8 Collar
9 Guide bar
9a Bore
9b End portion
9c End surface 9d Head bore
9e Groove
9f Shoulder
9g Stepped bore
9h Covering portion
10 Head screw
11 Inner sleeve
11a Shoulder
12 First rolling bellows
12a, 12b, 12c Bellows portion
12d Connecting portion
12e Web
12f Waisting
12g Ring portion
12h Interspace
13 Outer sleeve
13a, 13b End
14 Second rolling bellows
14a Connecting portion
15 Stop ring
15a Projection
15b Groove
15c Connecting portion
16 Retaining ring
16a Ring portion
17 Bead
18 Annular groove
19 Head
20 Cap
20a Collar
20b Covering portion
20c Groove
20d Outer surface
20e Bearing surface
21 Caliper bore
22 Seal
23 Latching nose
24 Latching recess
25 Play
26, 26a Clearance
$F_A$ Axial prestressing force
$F_R$ Radial prestressing force
SB Disc brake The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a utility vehicle, comprising:
a brake caliper which encompasses a brake disc and which is fastened to a positionally fixed brake carrier by two fastening elements so as to be axially displaceable with respect to the brake disc,
wherein
the two fastening elements each have a guide bar which is fixedly connected to the brake carrier, of which guide bars, for axial displaceability of the brake caliper, one is guided as a fixed bearing and the other is guided in a sliding bearing designed as a floating bearing which has a floating bearing axis,
at least the floating bearing has a guide bush which engages around the guide bar and which is retained in a caliper bore of the brake caliper so as to be secured against displacement,
a first tubular, length-variable seal which seals the guide bar with respect to the surroundings is arranged at least on an end region of the guide bar that faces away from the brake disc and is fastened on the one hand to the guide bar and on the other hand in the guide bush,
the first tubular, length-variable seal is clamped on the guide bar by a cap pressed into the guide bar,
the first tubular, length-variable seal has a ring portion which is inserted in a peripheral groove between a covering portion, a collar and a portion of a peripheral outer surface,
the ring portion is retained by the portion of the outer surface so as to be radially inwardly secured with respect to the floating bearing axis,
the ring portion is retained by the covering portion so as to be radially outwardly secured with respect to the floating bearing axis,
the collar is integrally formed on an end of the cap that faces away from the brake disc,
the outer surface is a peripheral outer surface of a cylindrical body of the cap,
the ring portion in each case directly and/or indirectly contacts the outer surface and the covering portion,
the ring portion is retained securely in a radially prestressed manner in the peripheral groove between the covering portion, the collar and the portion of the outer surface,
the ring portion in the peripheral groove forms a pressure-tight seal with respect to the cap,
the ring portion of the first tubular, length-variable seal has a circular cross section,
the peripheral groove is formed into an end face of the end region of the guide bar that faces away from the brake disc and is radially outwardly delimited with respect to the floating bearing axis by the covering portion as a portion of an end portion of the guide bar,
the covering portion extends axially parallel to the floating bearing axis,
the ring portion in the peripheral groove is prestressed axially directly or indirectly with respect to the guide bar by a peripheral web connected to the ring portion by a waisting,
the first tubular, length-variable seal is mounted via a connecting portion to the ring portion and to the web, and
the connecting portion forms a joint function between the tubular, length-variable seal and the ring portion and the web.

2. A disc brake for a utility vehicle, comprising:
a brake caliper which encompasses a brake disc and which is fastened to a positionally fixed brake carrier by two fastening elements so as to be axially displaceable with respect to the brake disc,
wherein
the two fastening elements each have a guide bar which is fixedly connected to the brake carrier, of which guide bars, for axial displaceability of the brake caliper, one is guided as a fixed bearing and the other is guided in a sliding bearing designed as a floating bearing which has a floating bearing axis,
at least the floating bearing has a guide bush which engages around the guide bar and which is retained in a caliper bore of the brake caliper so as to be secured against displacement, a first tubular, length-variable seal which seals the guide bar with respect to the surroundings is arranged at least on an end region of the guide bar that faces away from the brake disc and is fastened on the one hand to the guide bar and on the other hand in the guide bush, the first tubular, length-variable seal is clamped on the guide bar by a cap pressed into the guide bar, the first tubular, length-variable seal has a ring portion which is inserted in a peripheral groove between a covering portion, a collar and a portion of a peripheral outer surface, the ring portion is retained by the portion of the outer surface so as to be radially inwardly secured with respect to the floating bearing axis, the ring portion is retained by the covering portion so as to be radially outwardly secured with respect to the floating bearing axis, the collar is integrally formed on an end of the cap that faces away from the brake disc, the outer surface is a peripheral outer surface of a cylindrical body of the cap, the peripheral groove is formed as an annular groove between a lower side of the covering portion, an inner side of the collar and the outer surface, the covering portion is mounted on the outer radial end of the collar of the cap and extends axially parallel to the floating bearing axis in the direction of the brake disc, the ring portion is prestressed in the peripheral groove between the covering portion, the collar and the portion of the outer surface of the cap by a peripheral pressing, the ring portion is prestressed in the peripheral groove axially directly or indirectly with respect to the guide bar, the ring portion is axially connected to a peripheral web which is in contact with a peripheral end surface of the guide bar, a connection between the web and the ring portion is provided with a waisting, a second tubular, length-variable seal is connected to the side of the guide bush that is situated opposite to the first tubular, length-variable seal, and is connected on the other side to the guide bar, the second tubular, length-variable seal is fastened to a stop ring which is connected to the guide bush, the stop ring has on its outer surface a peripheral groove with a seal adjacent to an end of the stop ring facing toward the brake disc, the first tubular, length-variable seal is mounted via a connecting portion to the ring portion and to the web, and the connecting portion forms a joint function between the tubular, length-variable seal and the ring portion and the web.

3. The disc brake as claimed in claim 1, wherein the guide bush has an elastic inner sleeve.

4. The disc brake as claimed in claim 3, wherein the first tubular, length-variable seal is connected to the inner sleeve.

5. The disc brake as claimed in claim 3, wherein the first tubular, length-variable seal is formed in one piece with the inner sleeve.

6. The disc brake as claimed in claim 1, wherein the first tubular, length-variable seal is designed as a rolling bellows.

7. The disc brake as claimed in claim 2, wherein the ring portion is enveloped in the groove of the cap by its collar and the covering portion in an angular range of 160 to 190°, and the outer surface of the ring portion is directly or indirectly in contact at least with the outer surface of the cap and with the inner side of the covering portion of the cap.

8. The disc brake as claimed in claim 2, wherein a second tubular, length-variable seal is connected to the side of the guide bush that is situated opposite to the first tubular, length-variable seal, and is connected on the other side to the guide bar.

9. The disc brake as claimed in claim 8, wherein the second tubular, length-variable seal is fastened to a stop ring which is connected to the guide bush.

10. The disc brake as claimed in claim 9, wherein the stop ring has on its outer surface a peripheral groove with a seal adjacent to an end of the stop ring facing toward the brake disc.

11. The disc brake as claimed in claim 10, wherein the seal has at least one double sealing lip.

12. The disc brake as claimed in claim 11, wherein the seal is integrally formed as at least one double sealing lip on the stop ring in the groove.

13. The disc brake as claimed in claim 8, wherein the second tubular, length-variable seal has a bead on its edge facing away from the stop ring, which bead is situated in an annular groove of the guide bar and is retained by a retaining ring, which is fastened in the brake caliper, in the annular groove.

14. The disc brake as claimed in claim 8, wherein the second tubular, length-variable seal is designed as a second rolling bellows.

* * * * *